United States Patent [19]
Hollister

[11] Patent Number: 5,832,163
[45] Date of Patent: Nov. 3, 1998

[54] SINGLE MODE OPTICAL WAVEGUIDE WITH EXPANDED RARE-EARTH DOPED REGION

[75] Inventor: Jack H. Hollister, Chesterfield, Mo.

[73] Assignee: McDonnell Douglas Corporation, St. Louis, Mich.

[21] Appl. No.: 896,624

[22] Filed: Jul. 18, 1997

[51] Int. Cl.[6] .................................................. G02B 6/02
[52] U.S. Cl. .............................. 385/123; 385/124; 372/6
[58] Field of Search ..................... 385/123–128, 385/142, 144; 372/6, 41, 69

[56] References Cited

U.S. PATENT DOCUMENTS

| | | | |
|---|---|---|---|
| 4,923,279 | 5/1990 | Ainslie et al. | 350/96.3 |
| 5,039,190 | 8/1991 | Blonder et al. | 359/341 |
| 5,058,976 | 10/1991 | DiGiovanni | 359/173 |
| 5,206,925 | 4/1993 | Nakazawa | 385/142 |
| 5,259,046 | 11/1993 | DiGiovanni | 385/12 |
| 5,291,501 | 3/1994 | Hanna | 372/6 |
| 5,473,722 | 12/1995 | Sohler et al. | 385/132 |

*Primary Examiner*—Phan T. H. Palmer
*Attorney, Agent, or Firm*—Westerlund & Powell, P.C.; Raymond H. J. Powell, Jr.; Ramon R. Hoch

[57] ABSTRACT

A single mode optical waveguide includes a first region having a relatively high refractive index, a second region having a relatively low refractive index disposed adjacent to the first region, and a dopant region overlapping the first and second regions. Preferably, the first and second regions are circular regions which are concentric with respect to one another. Moreover, the dopant material in the dopant region advantageously can have a non-uniform dopant gradient. In addition, a predetermined percentage of dopant material defining the dopant region is disposed coincident with the second region. Preferably, the predetermined percentage is greater than or equal to 10 percent and, most preferably, the predetermined percentage is greater than or equal to 50 percent. Alternatively, the first region corresponds to an inner core of a dual core optical fiber, while the second region corresponds to an outer core of the dual core optical fiber.

27 Claims, 5 Drawing Sheets

MODE POWER

DOPANT DENSITY

REFRACTIVE INDEX

SINGLE MODE OPTICAL WAVEGUIDE WITH EXPANDED RARE-EARTH DOPED REGION

BACKGROUND OF THE INVENTION

The present invention relates generally to optical devices. More specifically, the present invention relates to optical devices having a single dopant region which overlaps first and second regions having first and second refractive indices, respectively.

It is well known that a silica-based optical fiber whose core region is doped with an appropriate luminescent (typically a rare earth) species can serve as an optical amplifier for signal radiation of an appropriate wavelength, or as a coherent radiation source, i.e., a laser. See, for example, U.S. Pat. Nos. 4,923,279 and 5,058,976. U.S. Pat. No. 4,923,279 discloses the advantage of providing a fiber with the highest concentration of the luminescent species (e.g., Er) at the center of the core, since such a distribution results in improved gain performance for a given pump power. U.S. Pat. No. 5,058,976 discloses specific Er-doped fiber designs which provide a fiber having a low amplification threshold and low noise. It should be noted that both of the above-mentioned patents, as well as the several patents discussed immediately below, are incorporated herein by reference for all purposes.

The conventional rare-earth doped single-mode optical fiber laser or amplifier 1 has an inner core with radius $r_1$ and index of refraction $n_1$, and one or more outer cores, the first of which has an index of refraction $n_2$, as shown in FIG. 1. It will be noted that in order to guide the single mode, the indices of refraction are chosen such that $n_1 > n_2$, where $n_1$ and $n_2$ are the indices of refraction in the inner core 10 and outer core 20, respectively. It will be appreciated that the rare-earth doping is contained within the inner core 10. The radial profiles for the index of refraction (or refractive index) n, the rare-earth doping concentration or density N, and the mode power of the optical field mode I are all illustrated in FIGS. 2A–2C, respectively.

U.S. Pat. No. 5,259,046 discloses several problems associated with the use of optical fiber amplifiers in a practical optical fiber communication systems. For instance, currently known designs for 1.48 μm pumped amplifiers are relatively sensitive to variations in cut-off wavelength of the fiber. This is a significant drawback, since it is typically difficult to control the cut-off wavelength of a single mode optical fiber to within better than 5%. It is particularly difficult to control the cut-off wavelength to better than about 5% in the small core, highly doped fibers typically used as optical amplifiers. As a further example, currently known designs for 0.98 μm pumped amplifiers are relatively sensitive to the distribution of the pump power among the spatial modes of the (single mode for the 1.5 μm signal radiation) fiber. In an effort to overcome these drawbacks, U.S. Pat. No. 5,259,046 discloses an optical fiber arrangement wherein the dopant is confined to an annular ring 31 in an optical fiber 30.

More specifically, FIG. 3 schematically shows the refractive index profile and Er-distribution of a fiber 30, wherein numeral 31 refers to an annular Er-doped region having inner and outer radii r1 and r2, respectively. If radius values are replaced by analogous values of a defined coordinate z, then FIG. 3 alternatively represents an exemplary waveguide. FIG. 4 shows the computed gain for the optical amplifier illustrated in FIG. 3. The parameter η of FIG. 4 is the fraction of pump power present in the $LP_{11}$ mode. Curve 41 pertains to η=0 and 0.2. Curves 42–45 pertain to η=0.4, 0.6, 0.8 and 1.0, respectively. The values of r1 and r2 are 0.7a and 0.95a, respectively. It will be noted that the term "a" denotes the radius of the optical fiber 30. A design having approximately (e.g., within 10% for r1, within −10% and a for r2) these values for r1 and r2 results in robustness in amplifier behavior against changes in fractional pump power in the $LP_{11}$ mode and is currently preferred for 0.98 μm pumped amplifiers.

As discussed in U.S. Pat. No. 5,206,925 optical fiber amplifiers and fiber lasers in which the core layer of an optical fiber is doped with a rare earth element, such as Er (for amplification at wavelengths around 1.55 μm) and Nd (for amplification at wavelengths around 1.3 μm), are being vigorously studied for use in such applications as optical amplifiers. The optical fiber amplifiers and fiber lasers have the advantages that (1) the core diameter of these devices is as small as 10 μm, which ensures an enhanced excitation power density, leading to a higher excitation efficiency, (2) these devices permit a longer interaction length, (3) these devices exhibit a very low loss when a silica optical fiber is used.

With respect to waveguides and similar devices, one example of a conventional optical waveguide was disclosed in U.S. Pat. No. 5,473,722. FIG. 5 shows a section through a crystal 100, from the surface of which rare-earth doping has been introduced into a doping region 102 surrounded by a light-guide channel 104 formed by a titanium diffusion (TD) or proton exchange. The rare-earth doping region 102 has a lesser width (W) than the light-guide channel 104 and a lesser doping depth (TS) than a channel depth (KT) of the light-guide channel 104. The maximum concentration of rare-earth doping region 102 is located in a doping center (Z) below the crystal surface 101.

It will be appreciated that it is difficult for an optical waveguide with a planar structure to be formed into an elongated shape, as in the case of an optical fiber. To obtain a better excitation efficiency, therefore, conventional wisdom dictates that an increased amount of a rare earth element should be added to the core of the optical waveguide. Experimental results have been obtained that indicated that doping the waveguide with a large amount of a rare earth element can cause concentration extinction, thereby making it impossible to obtain the desired degree of lasing or amplifying effect.

U.S. Pat. No. 5,206,925 suggests several alternative ways of configuring a waveguide so as to avoid concentration extinction, which alternative ways all require zoning of the optical core into regions with different dopant concentrations. For example, FIG. 6 shows a rare earth element-doped waveguide 200 which includes a substrate 202, e.g., a substrate of a semiconductor such as Si and GaAs; a substrate of a glass such as $SiO_2$ and $SiO_2$ doped with a refractive index controlling dopant; a substrate of a ferroelectric material such as $LiNbO_3$ and $LiTaO_3$; or a substrate of a magnetic material such as YIG, a cladding 204 of a lower refractive index, n2, formed on the substrate 202, and a core waveguide 206 of a higher refractive index, n1, wherein the condition n1>n2 is satisfied. It will be noted that core waveguide 206 is buried in the cladding 204.

The cladding 204 may be formed by using $SiO_2$ or using $SiO_2$ containing at least one dopant, such as B, F, P, Ge, Ti, Al, Ta, Zn, K, Na, La and Ba. The core waveguide 206 is also formed by using a material similar to the material for the cladding 204. In a central region T of the core waveguide 206 with respect to the direction of thickness T, a rare earth element-doped layer 208 is provided. The dopant for the rare earth element-doped layer 208 is generally a dopant containing at least one element selected from group consisting of Er, Nd, Yb, Sm, Ce, Ho, Tm and the like. In the case of a single-mode optical waveguide, the refractive-index difference between the core waveguide 206 and the cladding 204 is selected in the range of 0.2 to 0.7%. The thickness T of the core waveguide 206 is selected in the range of from several micrometers to ten and a few micrometers, and the width W of the core waveguide 206 is selected in the range of from several micrometers to ten and a few micrometers.

For stronger confinement of light in the width direction of the core waveguide 206 and for efficient and concentrated absorption of excitation light into the region of the rare earth element-doped layer 208, the core waveguide 206 is so designed that W>T. For instance, where the optical waveguide 200 is to be used as a single-mode optical waveguide at a wavelength around 1.55 $\mu$m, the core waveguide 204 is designed such that T=7 $\mu$m, W=11 $\mu$m, and the refractive-index difference between the core waveguide 204 and the cladding 202 is 0.25%, and T=1 $\mu$m to 4 $\mu$m. When the region where the power distribution of excitation light reaches its maximum in the core waveguide 206, namely, a central portion with respect to the layer thickness direction of the core waveguide 206 which is doped with a rare earth element, it is possible to obtain a high excitation efficiency through doping with a small amount of the rare earth element. That is, the arrangement in FIG. 6 permits the doping with a reduced amount of a rare earth element, as compared with the doping amount in the conventional doping where the core waveguide 206 is doped in whole with the rare earth element. The specific arrangement illustrated in FIG. 6 provides a waveguide 200 with a higher excitation efficiency. Consequently, it is possible to realize a high-gain optical amplification concentration extinction.

FIGS. 7A–7D each show a refractive-index distribution in the thickness direction of the rare earth element-doped optical waveguide shown in FIG. 6. For example, FIG. 7A shows the case where the refractive-index distribution in the thickness direction of the core waveguide 206 is flat, i.e., where the refractive index of the rare earth element-doped layer 208 is equal to the refractive index in the rare earth element-undoped region of the core waveguide 206. FIGS. 7B–7D show the cases where the refractive index of the rare earth element-doped layer 208 is slightly higher than the refractive index in the rare earth element-undoped region of the core waveguide 206. More specifically, FIG. 7B shows the case where the refractive-index distribution in the rare earth element-doped layer 208 is flat, FIG. 7C shows the case where the refractive index increases stepwise as a central portion of the waveguide 206 is approached, and FIG. 7D shows the case where the refractive index increases continuously in a curved line form as the central portion of the waveguide 206 is approached. With the refractive index of the rare earth element-doped layer 208 set greater than the refractive index in the surrounding core waveguide 206, as shown in FIGS. 7B to 7D, the confinement of excitation light in the rare earth element-doped layer 208 is strengthened, and a higher excitation efficiency can be expected.

Moreover, U.S. Pat. No. 5,039,190 discloses alternative waveguides employing a similar doping methodology. More specifically, FIG. 8 schematically depicts the cross section of waveguide 300 wherein numeral 302 refers to a substrate body, e.g., a Si body, and numeral 304 refers to first cladding material, e.g., $SiO_2$ formed by oxidation of the Si body. Core 306 is disposed on 302, with second cladding material 308 surrounding the core. The core comprises a first region 306a having a relatively high rare earth concentration, and a second region 306b having a relatively low rare earth concentration. The maximum rare earth concentration in 306a is at least twice (preferably at least 5 times or even 10 times) the maximum concentration in 306b. The second cladding can be $SiO_2$ but could be any other appropriate transparent medium, provided the refractive index of the core glass is sufficiently higher than that of the second cladding material such that radiation of a predetermined wavelength is guided in the structure.

FIG. 9 schematically depicts the cross section of another waveguide 300' which differs from that of FIG. 8 in that the first core region 316a is surrounded by the second core region 316b. This results in an efficient coupling between the dopant atoms and the mode field of the signal radiation if the waveguide 300' is a single mode guide.

Given the disclosures in U.S. Pat. Nos. 4,923,279, 5,039,190, 5,058,976, 5,206,925, 5,259,046, and 5,473,722, the lesson learned from these patents, in combination, is that the optimum design of any core of the optical fiber or waveguide should include regions of both high and low dopant density. Moreover, the patents, in combination, disclose fiber laser systems and the like where the dopant density is restricted both to the inner core and to a specific region of the inner core. However, present rare-earth doped single-mode optical fibers employed in lasers and saturated optical amplifiers are limited in gain and pump absorption coefficients. It will be appreciated that this is due to the small size of the doped inner core of the optical fiber as well as by limitations in the allowable rare-earth doping concentration, as previously discussed. What is needed, therefore, is a design which increases the overall dopant level in the optical device.

In view of the great commercial significance of optical waveguide amplifiers and lasers, it would be highly desirable to have available a waveguide design which overcomes (or is at least less subject to) the above discussed shortcomings. Such a design, and waveguides (including silica-based Er-doped optical fibers and planar waveguides) that embody the inventive design, are disclosed herein.

SUMMARY OF THE INVENTION

Based on the above and foregoing, it can be appreciated that there presently exists a need in the art for optical fibers and waveguides which overcomes the above-described deficiencies. The present invention was motivated by a desire to overcome the drawbacks and shortcomings of the presently available technology, and thereby fulfill this need in the art.

One object according to the present invention is to provide an optical device wherein the rare-earth doped region of the optical device is expanded without expanding the guided mode size. According to one specific aspect of the present invention, the optical device is an optical fiber.

Another object according to the present invention is to provide an optical device having a rare-earth doped region which is expanded in size without an attendant expansion in the guided mode size to thereby permit an increase in pump radiation absorption coefficients.

Still another object according to the present invention is to provide an optical device having a rare-earth doped region which is expanded in size without an attendant expansion in the guided mode size to thereby facilitate an increased gain per unit length. It will be noted that an increase in gain per unit length advantageously permits shorter elements, e.g., optical fibers, to be employed in the fabrication of the fiber laser or waveguide amplifier.

Yet another object according to the present invention is to provide an optical device having a rare-earth doped region which is expanded in size without an attendant expansion in the guided mode size to thereby facilitate more efficient amplifier operation. It will be appreciated that the advantage mentioned immediately above will be most significant for amplifiers operated in the saturated regime and for oscillators of various types well known to those of ordinary skill in the art.

These and other objects, features and advantages according to the present invention are provided by a single mode optical waveguide, including a first region having a relatively high refractive index, a second region having a relatively low refractive index disposed adjacent to the first region, and a dopant region overlapping the first and second regions. According to a first aspect of the present invention, the first and second regions comprise circular regions which regions are substantially concentric with respect to one another. According to an alternative aspect of the present invention, the first and second regions comprise polygons which polygons are substantially coaxial with respect to one another. It will be appreciated that the present invention can be practice by selecting circular and polygon regions at the designer's discretion. According to a second aspect of the inventive waveguide, dopant material in the dopant region has a nonuniform dopant gradient. According to a third aspect of the invention, a predetermined percentage of dopant material defining the dopant region is disposed coincident with the second region. Preferably, the predetermined percentage is greater than or equal to 10 percent and, most preferably, the predetermined percentage is greater than or equal to 50 percent. Moreover, according to yet another aspect of the inventive waveguide, the first region corresponds to an inner core of a dual core optical fiber and wherein the second region corresponds to an outer core of the dual core optical fiber.

These and other objects, features and advantages according to the present invention are provided by a single mode optical waveguide providing relatively high pump radiation absorption coefficients, relatively high gain per unit length, and more efficient amplifier operation. Advantageously, the optical waveguide includes a first region having a first refractive index, a second region having a second refractive index lower than the first refractive index disposed adjacent to the first region, and a dopant region extending into both the first and second regions.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

According to a broad aspect the present invention, an optical system (hereinafter optical device) includes an optical fiber or waveguide that is suitable for forming a fluorescent device (e.g., an optical amplifier, a laser or a superluminescent source), with the fluorescent dopant distribution in the waveguide being such that the doped region of the fluorescent device is expanded without concurrently expanding the guided mode size. It should be mentioned that this allows for increased pump radiation absorption coefficients, and more efficient amplifier operation. It should also be mentioned that this allows for increased gain per unit length and, thus, shorter fibers advantageously can be employed in the laser or optical amplifier. The abovementioned advantages will be most significant for amplifiers operated in the saturated regime and for oscillators of all types.

It will be appreciated that the optical device of the present invention may be embodied in planar as well as in circular optical waveguides. The former are generally referred to simply as "waveguides" while the latter are commonly referred to as "optical fibers." Both types of optical devices include a "core" that has relatively high refractive index and a "cladding" that has relatively low refractive index and that at least partially surrounds the core. It should also be noted that when the optical device is an optical fiber, the optical fiber advantageously can be a dual core optical fiber consisting of an inner core, an outer core and a cladding.

Figure 1:
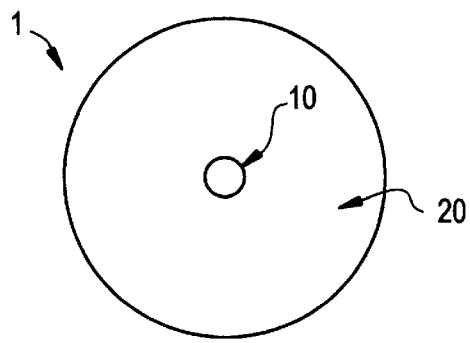
FIG. 1 is a view, in cross section, of a conventional rare-earth doped optical fiber.
Figure 2C:
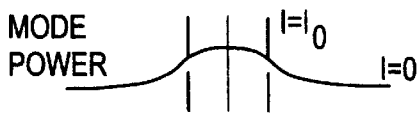
FIGS. 2A through 2C are radial profiles of the refractive index n, the rare-earth doping density N, and the mode power of the optical field mode I, respectively.
Figure 2B:
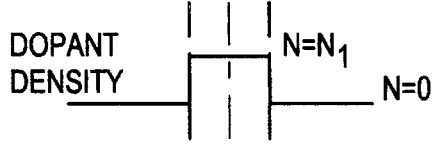
Figure 2A:
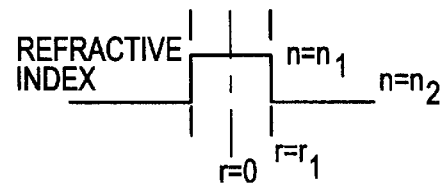
Figure 3:
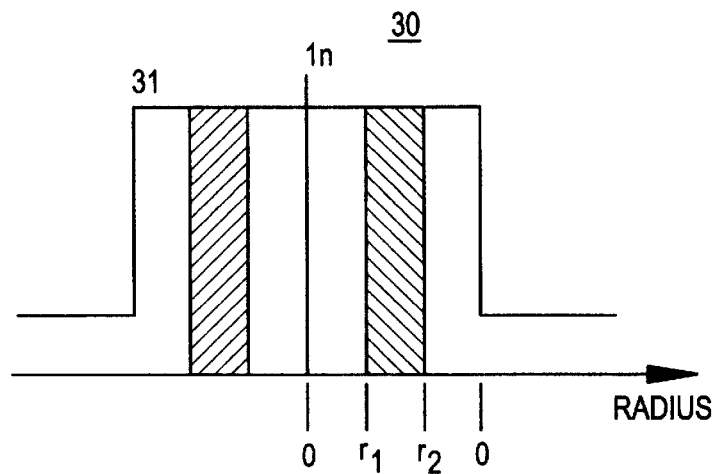
FIG. 3 is an interior view of a conventional optical fiber employing a non-uniform dopant gradient.
Figure 4:
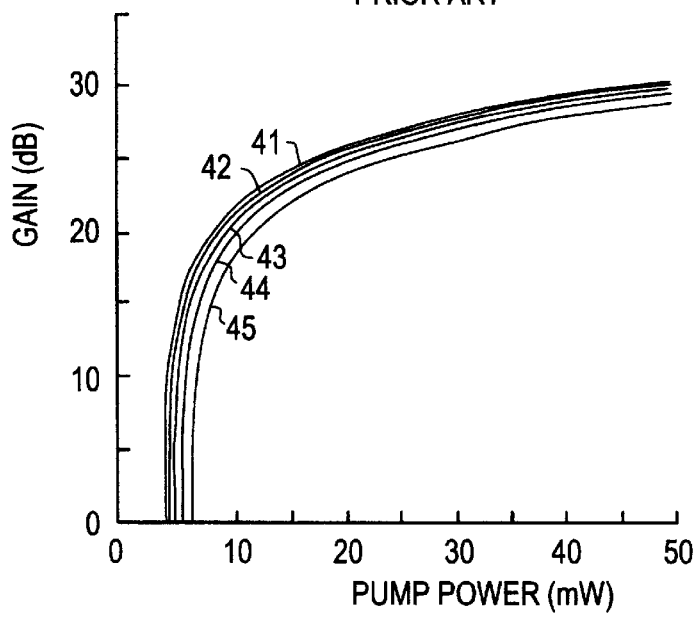
FIG. 4 illustrates various gains produced by the optical fiber illustrated in FIG. 3.
Figure 5:
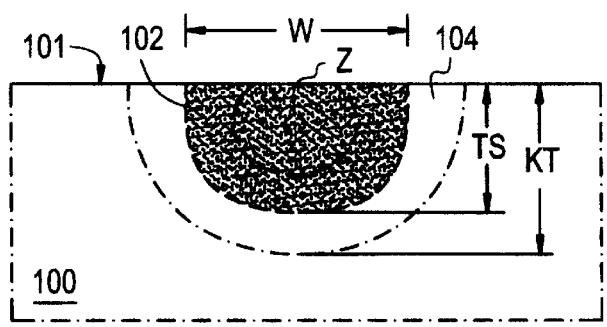
FIG. 5 illustrates the interior view of a conventional waveguide employing a non-uniform dopant gradient.
Figure 6:
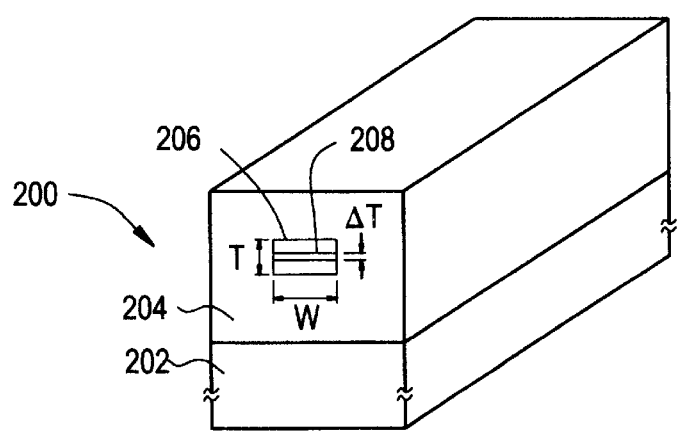
FIG. 6 depicts the construction of another conventional waveguide employing a non-uniform dopant gradient.
Figure 7A:
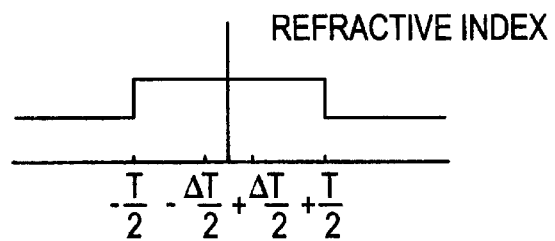
FIGS. 7A–7D illustrate various dopant gradients associated with the waveguide of FIG. 6.
Figure 7B:
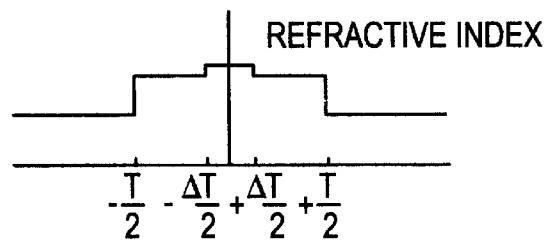
Figure 7C:
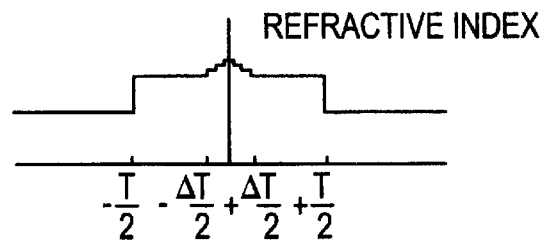
Figure 7D:
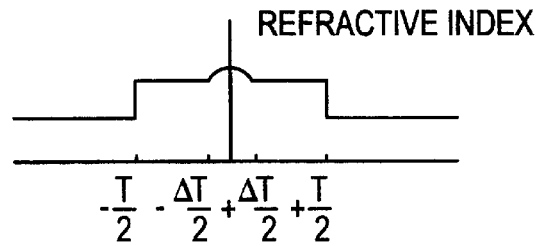
Figure 8:
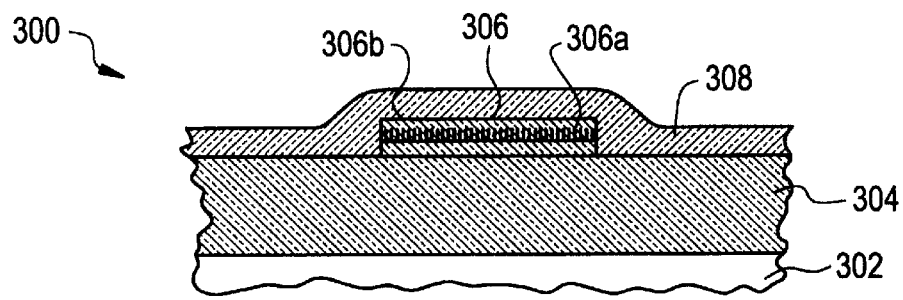
FIGS. 8 and 9 are alternative interior views of still other conventional waveguides employing non-uniform dopant gradients.
Figure 9:
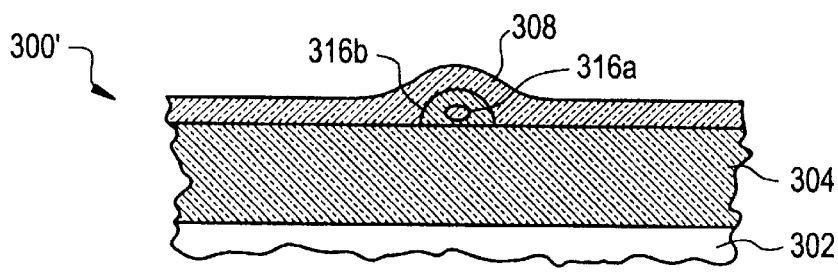
Figure 10:
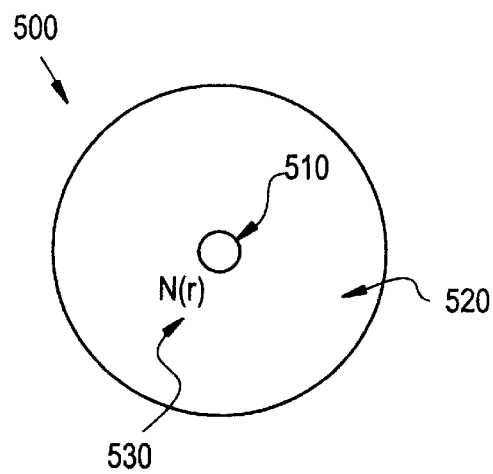
FIG. 10 is a view, in cross section, of a rare-earth doped optical fiber according to a preferred embodiment of the present invention.

According to a fundamental aspect of the present invention, the rare earth doping of the optical device advantageously extends outside the inner, high index core, i.e., the rare earth doping of the optical device extends into the outer, relatively low index cladding or core, as shown in FIG. 10. More specifically, FIG. 10 depicts an optical device 500, which includes a high refractive index first region 510 adjacent to a lower refractive index second region 520. In an exemplary case wherein the optical device 500 represents an optical fiber, the first region 510 is wholly surrounded by the second region 520; for other forms of the optical device 500 such as optical waveguides, other configurations advantageously can be employed. In addition, the optical device 500 includes a dopant region 530, which dopant region overlaps both the first and second regions 510, 520. Stated another way, one aspect of the optical amplifier according to the present invention is that the doped region of the optical fiber or waveguide advantageously extends outside the inner guided core.

Figure 11C:
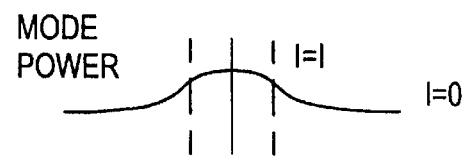
FIGS. 11A to 11C are radial profiles of the refractive index n, the rare-earth doping density N, and the optical field intensity I, respectively, of an optical fiber according to the present invention of FIG. 10.
Figure 11B:
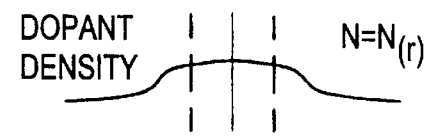
Figure 11A:
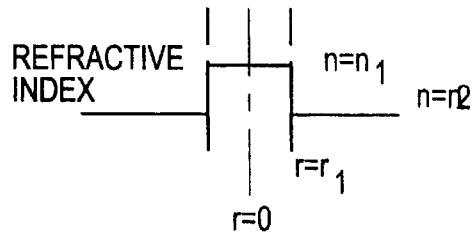
Figure 12A:
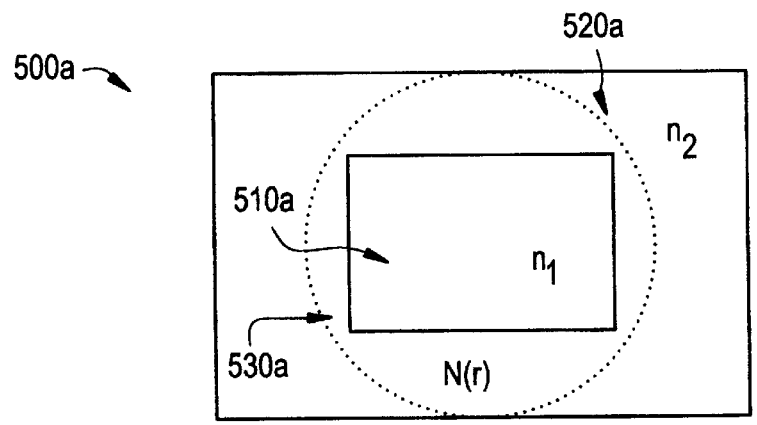
FIG. 12A to 12C are alternative embodiments of a waveguide, viewed in cross section, according to the present invention.
Figure 12B:
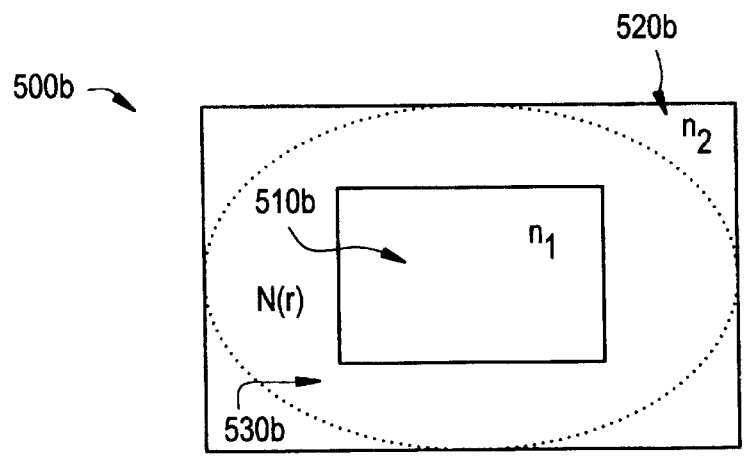
Figure 12C:
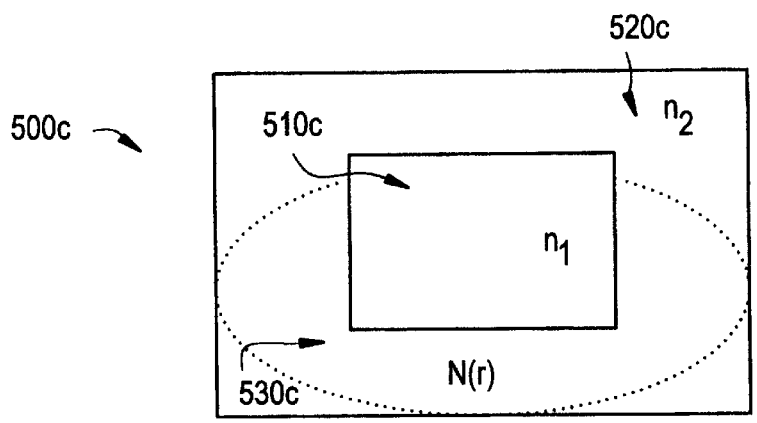

FIG. 10 illustrates the non-limiting exemplary case wherein the first, second and dopant regions 510, 520 and 530 are all concentric with one another. FIGS. 11A–11C illustrate radial profiles of the refractive index n, the rare-earth doping density N, and the mode power, i.e., intensity I of the optical field, respectively, of an optical device 500 according to a preferred embodiment of the present invention. FIGS. 12A–12C illustrate alternative preferred embodiments of the present invention wherein the optical device 500 comprises waveguides 500a, 500b and 500c, respectively. In FIGS. 12A-12C, it should be noted that the dopant regions 530a, 530b, and 530c disposed within second region 520a, 520b, and 520c beneficially need not be centered on the geometric center of the respective first regions 510a, 510b, and 510c; the dopant region advantageously can be formed in any practical shape suitable to the design of the optical device.

It should be noted that a substantial percentage of the dopant provided by dopant region 530 of, for example, optical device 500, advantageously can be disposed in second region 520. Preferably, at least 10% of the dopant material in dopant region 530 is disposed within second region 520 although the percentage of dopant advantageously can range, in an exemplary case, between 25% and 50%. It should also be noted that the case wherein the dopant percentage in second region 520 exceeds 50% is also considered to be within the scope of the present invention.

Thus, the improved optical device 500 according to the present invention employs much more of the available cross-sectional area in a fiber or waveguide to thereby permit greater absorption without increasing the doping level in the core 510. As mentioned above, the index I, doping density N, and field mode profiles provided by the exemplary optical device, e.g., optical amplifier, illustrated in FIG. 10, are shown in FIGS. 11A–11C.

It should be mentioned that the doping advantageously can be constant out to a given radius, i.e., N(r), or graded with an arbitrary profile, as discussed in greater detail below. Thus, the doping profile illustrated in FIG. 10 represents only one exemplary case, i.e., an optical fiber; the doping profile may be tailored to fit the degree of saturation that the optical fiber or waveguide is operated under, the confinement level of the mode, or other factors. It should also be noted that when the optical device is an optical fiber, the optical fiber advantageously can be a dual core optical fiber consisting of an inner core doped with one or more rare earth dopants, an outer core at least partially doped with one or more rare earth dopants surrounding the inner core, and a cladding surrounding the outer core. The cladding may or may not be doped, depending on the specific design parameters of the dual-core optical device.

More particularly, an optical device 500 according to the invention illustrated in FIG. 10 includes a core 510 and a cladding 520 that at least partially surrounds the core 510 and has an interface therewith. The core 510 contains the fluorescent dopant (typically a rare earth material such as Er, Nd, Yb, Sm, Tm and Pr) and has a center. If the optical device 500 is an optical fiber, then a portion of the fluorescent dopant is dispersed substantially throughout the entire core 510 and the remaining portion of the dopant is substantially disposed in outer core 520. In an exemplary case, the concentration of the fluorescent dopant is substantially higher at the geometric center of the core 510; it will be appreciated that other dopant gradient profiles are possible and all such profiles fall within the scope of the present invention. It should also be mentioned that when the optical device 500 is a planar waveguide, then the fluorescent dopant distribution advantageously can be confined to a portion of the total volume of the core 510.

The exemplary optical device 500 according to the present invention advantageously may be embodied in any suitable glass system, but silica-based waveguides, especially silica-based fibers, are currently of greatest commercial interest. Furthermore, the present invention may be practiced with any suitable fluorescent dopant, but rare earth dopants are currently of most commercial interest. In particular, for communication systems that use signal radiation of about 1.5–1.6 $\mu$m (e.g., 1.56 $\mu$m), Er is currently the dopant of greatest commercial interest.

In summary, one preferred embodiment of the present invention is an optical device wherein the doped region of the optical fiber is expanded without necessitating a corresponding expansion of the guided mode size. It will be noted that this allows greater pump radiation absorption coefficients, greater gain per unit length, shorter fibers for the laser or amplifier, and more efficient amplifier operation. It should again be mentioned that these advantages will be most significant for amplifiers operated in the saturated regime and for oscillators.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A single mode optical waveguide, comprising:
    a first region having a relatively high refractive index;
    a second region having a relatively low refractive index disposed adjacent to said first region; and
    a dopant region overlapping said first and second regions, wherein a same type of dopant material is present in both said first region and said second region where overlapped by said dopant region.

2. The single mode optical waveguide as recited in claim 1, wherein a predetermined percentage of dopant material defining said dopant region is disposed coincident with said second region.

3. The single mode optical waveguide as recited in claim 2, wherein said predetermined percentage is greater than or equal to 10 percent.

4. The single mode optical waveguide as recited in claim 2, wherein said predetermined percentage is greater than or equal to 50 percent.

5. The single mode optical waveguide as recited in claim 1, wherein dopant in said dopant region has a non-uniform dopant gradient.

6. The single mode optical waveguide as recited in claim 1, wherein the second region substantially surrounds said first region.

7. The single mode optical waveguide as recited in claim 1, wherein said first and second regions comprise circular regions which regions are substantially concentric with respect to one another.

8. The single mode optical waveguide as recited in claim 1, wherein said first and second regions comprise planar regions disposed parallel to one another.

9. The single mode optical waveguide as recited in claim 1, wherein said first region comprises an inner core of a dual core optical fiber and wherein said second region comprises an outer core of said dual core optical fiber.

10. A single mode optical waveguide providing relatively high pump radiation absorption coefficients, relatively high gain per unit length, and more efficient amplifier operation, comprising:
    a first region having a first refractive index;

a second region having a second refractive index lower than said first refractive index disposed adjacent to said first region; and a dopant region extending into said first and second regions, wherein a same type of dopant material is present in both said first region and said second region where said dopant region extends therein.

11. The single mode optical waveguide as recited in claim 10, wherein a predetermined percentage of dopant material defining said dopant region is disposed coincident with said second region.

12. The single mode optical waveguide as recited in claim 11, wherein said predetermined percentage is greater than or equal to 10 percent.

13. The single mode optical waveguide as recited in claim 11, wherein said predetermined percentage is greater than or equal to 50 percent.

14. The single mode optical waveguide as recited in claim 10, wherein said dopant material in said dopant region has a non-uniform dopant gradient.

15. The single mode optical waveguide as recited in claim 10, wherein dopant material comprises a rare earth element and wherein said dopant material in said dopant region has a nonuniform dopant gradient.

16. The single mode optical waveguide as recited in claim 10, wherein the second region substantially surrounds said first region.

17. The single mode optical waveguide as recited in claim 10, wherein said first and second regions comprise substantially coaxial polygonal regions.

18. The single mode optical waveguide as recited in claim 10, wherein said first and second regions comprise planar regions disposed parallel to one another.

19. The single mode optical waveguide as recited in claim 10, wherein said first region comprises an inner core of a dual core optical fiber arid wherein said second region comprises an outer core of said dual core optical fiber.

20. A single mode optical waveguide providing relatively high pump radiation absorption coefficients, relatively high gain per unit length, and more efficient amplifier operation, comprising:

a first region having a first refractive index and including X percent doping material;

a second region having a second refractive index lower than said first refractive index disposed adjacent to said first region and including Y percent doping material;

wherein X and Y are positive real numbers; and and wherein X+Y=1.0, and wherein said first region doping material and said second region doping material are the same dopant material.

21. The single mode optical waveguide as recited in claim 20, wherein the second region substantially surrounds said first region.

22. The single mode optical waveguide as recited in claim 20, wherein cross sections of said first and second regions comprise one of a circular cross section and a polygonal cross section, respectively.

23. The single mode optical waveguide as recited in claim 20, wherein said first and second regions comprise planar regions disposed parallel to one another.

24. The single mode optical waveguide as recited in claim 20, wherein doping material comprises a rare earth element.

25. The single mode optical waveguide as recited in claim 20, wherein Y is greater than of equal to 0.9 X.

26. The single mode optical waveguide as recited in claim 20, wherein Y is greater than of equal to 0.5 X.

27. The single mode optical waveguide as recited in claim 20, wherein said first region comprises an inner core of a dual core optical fiber and wherein said second region comprises an outer core of said dual core optical fiber.

* * * * *